P. T. SNYDER.
WATER CURRENT AND AIR MOTOR.
APPLICATION FILED AUG. 10, 1910.
1,015,517.
Patented Jan. 23, 1912.
3 SHEETS—SHEET 1.
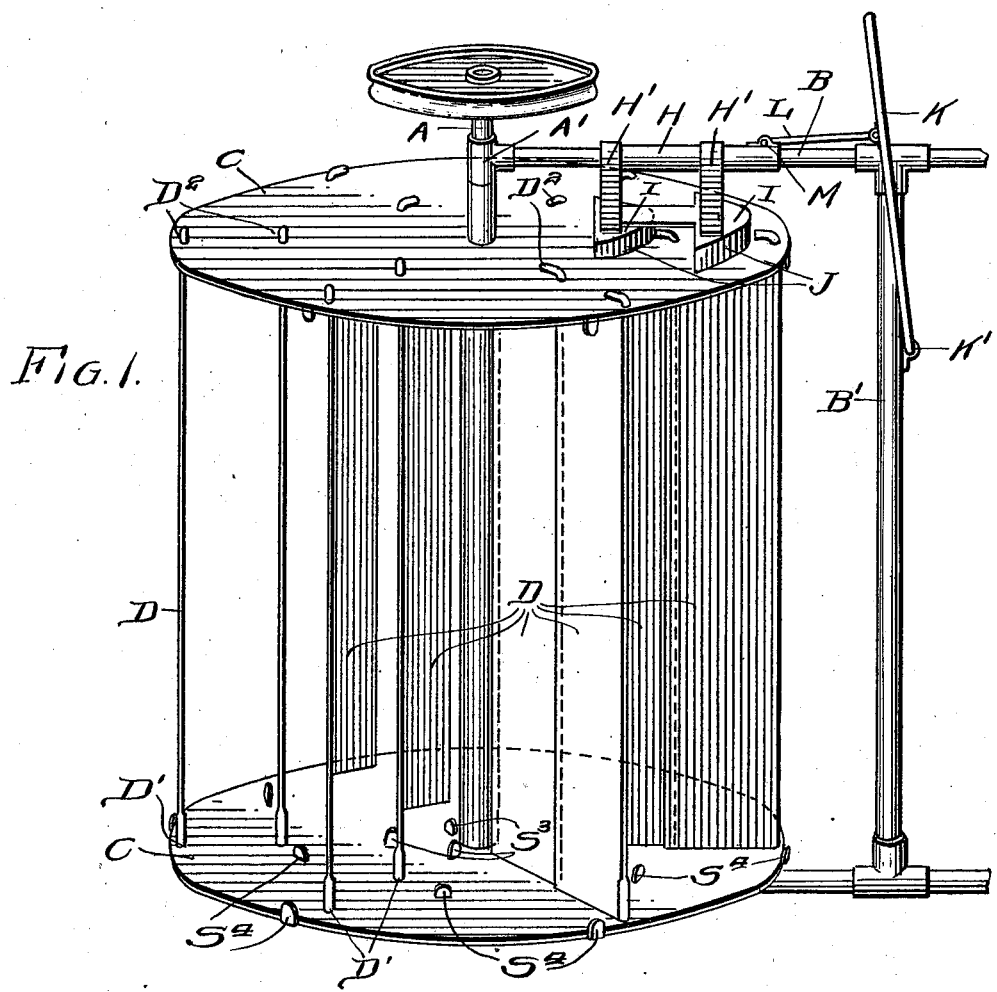
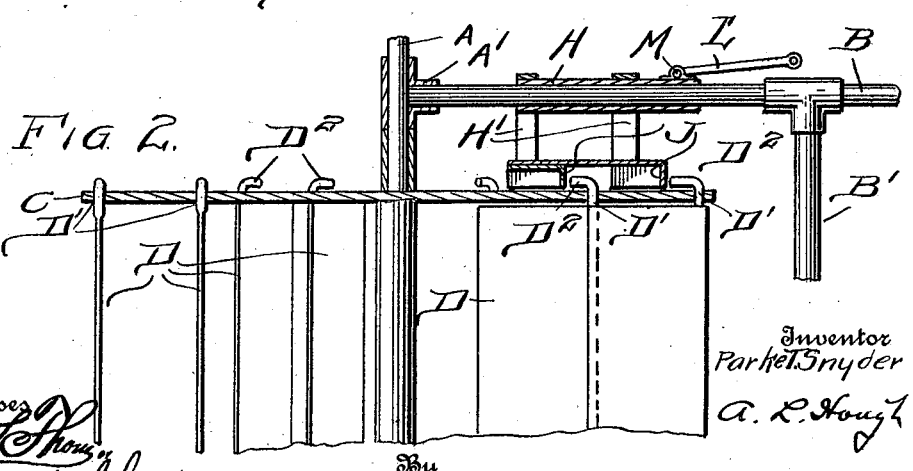

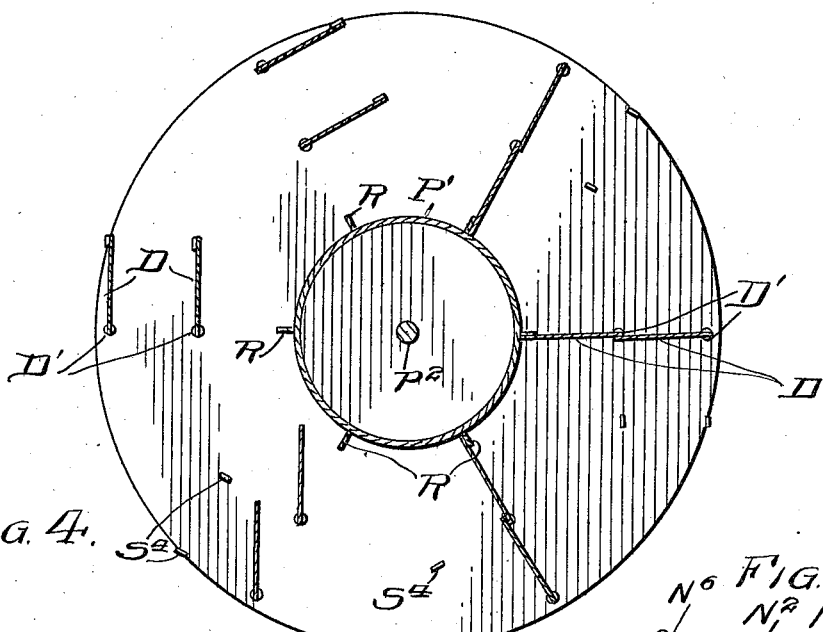
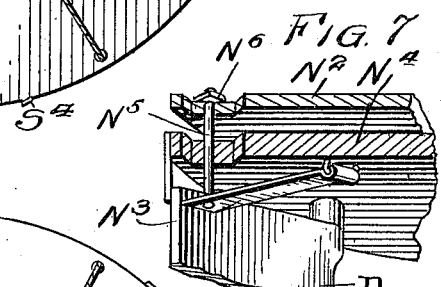
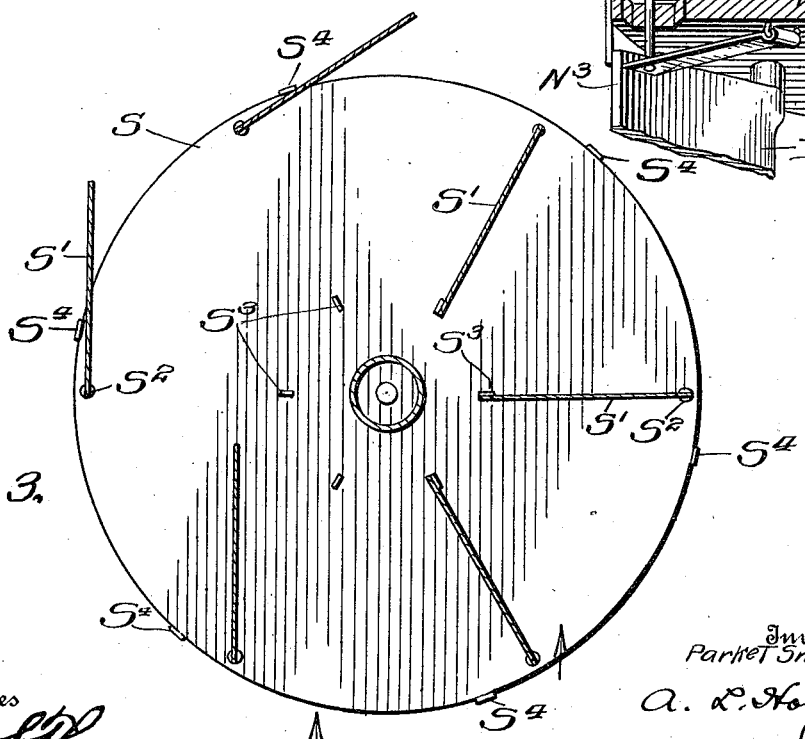

P. T. SNYDER.
WATER CURRENT AND AIR MOTOR.
APPLICATION FILED AUG. 10, 1910.
1,015,517.
Patented Jan. 23, 1912.
3 SHEETS—SHEET 3.
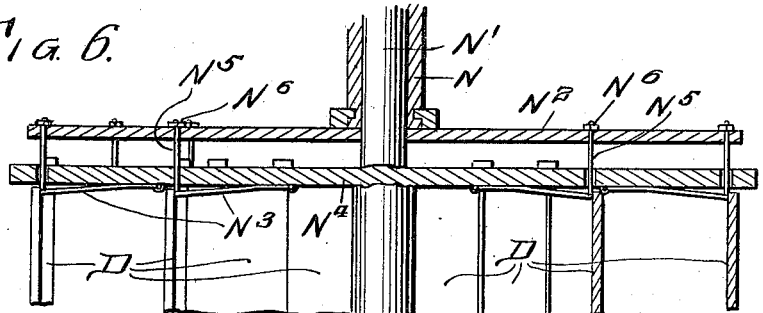
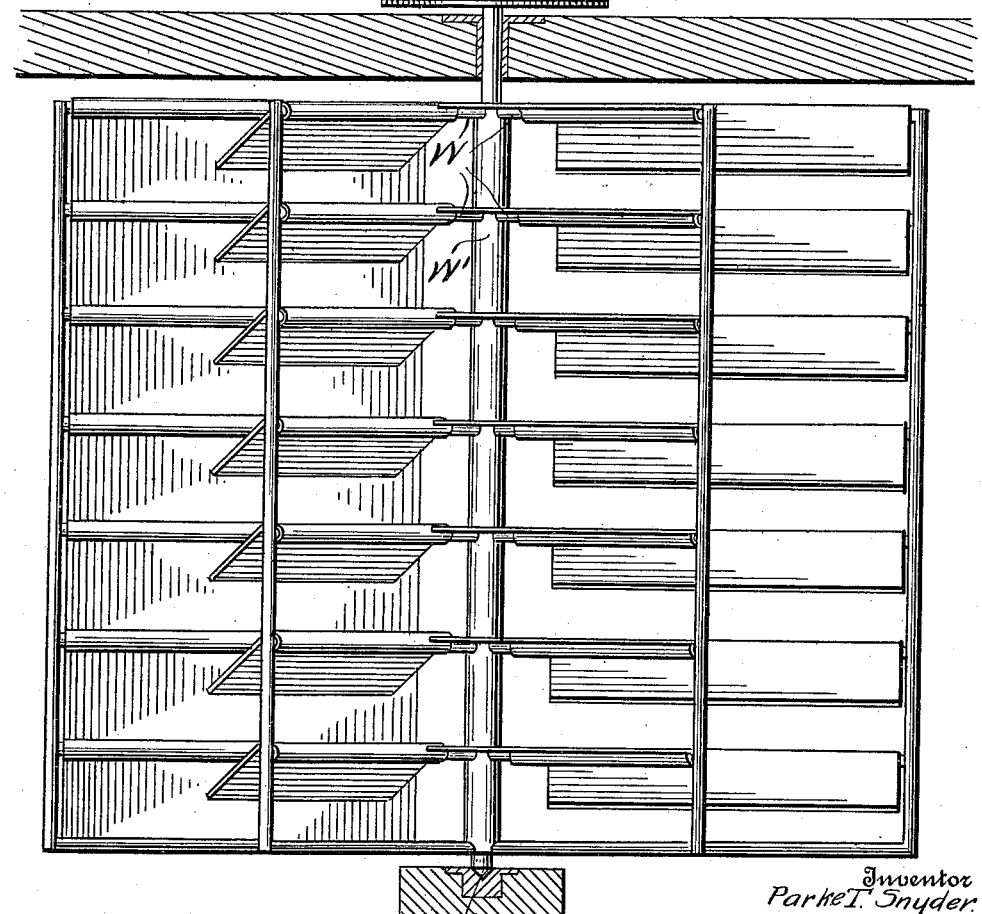

UNITED STATES PATENT OFFICE.

PARKE T. SNYDER, OF CELINA, OHIO.

WATER-CURRENT AND AIR MOTOR.

1,015,517.  Specification of Letters Patent.  Patented Jan. 23, 1912.

Application filed August 10, 1910. Serial No. 576,540.

*To all whom it may concern:*

Be it known that I, PARKE T. SNYDER, a citizen of the United States, residing at Celina, in the county of Mercer and State of Ohio, have invented certain new and useful Improvements in Water-Current and Air Motors; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in water current operated or air-propelling motors and the object in view is to produce a simple and efficient apparatus of this nature especially adapted for use in currents of running streams or as a tide motor to utilize the ebb and flow or the under current in an ocean, waves from the surface of bodies of water, etc.

The invention consists further in an apparatus of this nature so constructed of a plurality of wings or blades and so mounted without a casing that several of the blades will be subjected to the impact of the moving water or air while others are thrown into position to feather and offering a minimum amount of resistance while returning to inoperative positions.

The invention consists further in the provision of a series of swinging wings or blades mounted to swing in suitable bearings connected to a shaft and so arranged that certain of the blades will be automatically thrown to positions to increase the fulcrum power bearing against the blade when the latter is blanked by an adjacent blade, means being provided for holding the blades in inoperative positions while being acted upon by a current of water.

Another feature of the invention consists in the provision of means for holding the blades in inoperative positions when it is desired to stop the motor.

The invention consists further of various other details of construction and combinations and arrangements of parts which will be hereinafter fully described and then specifically defined in the appended claims.

I illustrate my invention in the accompanying drawings, in which:—

Figure 1 is a perspective view of my improved current motor. Fig. 2 is a sectional view longitudinally through one end of the same. Fig. 3 is a cross sectional view through the motor. Fig. 4 is a detail view through a modified form of the invention in which the blades are arranged in pairs. Fig. 5 is a modification of the invention showing the blades mounted at right angles to the positions of the blades shown in Fig. 1. Fig. 6 is a sectional view showing a modified means of holding the blades in inoperative positions, and Fig. 7 is a detail view.

Reference now being had to the details of the drawings by letter, A designates a shaft upon which the motor is mounted, said shaft being shown in the drawings as mounted in bearings A' upon tubular portions B of a frame B'. Said motor is shown as having two disks C, although spider wheels or other forms may be substituted for said disks and which disks have mounted therein a series of swinging blades D which, in the drawings, are shown as having spindle ends D' projecting preferably adjacent to one of the longitudinal marginal edges of each blade and each spindle end is journaled in one of said disks C. In Fig. 1 of the drawings, I have shown corresponding ends $D^2$ of said spindles as projecting through one of the disks and bent at right angles for a purpose which will be presently described.

In Fig. 3 of the drawings, I have shown a slight modification of the invention in which the disk S is provided with a series of single blades, each designated by letter S' and each blade having a pintle $S^2$, and each end adjacent to its longitudinal edge and a circular series of lugs $S^3$ projects from the inner face of each disk and each lug adapted to serve as a stop to limit the swinging movement of the blade S' in one direction. Projecting from each disk S adjacent to its circumference is a second series of lugs, each designated by letter $S^4$, and against the lugs $S^4$ one or more of the blades S' is adapted to fulcrum, as shown clearly in Fig. 3 for the purpose of increasing the propulsive power of the water upon the motor at a certain point in the rotary movement of the motor.

In Fig. 3 of the drawings, two of the blades are fulcrumed against two of said lugs, while one of the other blades is in feathering position and the others in position to receive the impact of the current of water.

In order to hold certain of the blades in operative positions while the others will automatically feather, I provide the means shown in Figs. 1 and 2 of the drawings and in which a shell H is shown as being mounted to reciprocate upon the pipe B, and casings I, substantially semi-cylindrical in shape, are connected together and a strap H' is fastened to each casing and passes about the shell H to which they are fastened. The convexed surfaces J of said casings are adapted to be moved into the paths of the angled ends D² of the rods D' when the said shell H is at its farthest outer limit. When at its opposite or innermost limit, the convexed surfaces J will be out of the paths of the angled ends D² and which latter adjustment of the parts is illustrated in Figs. 1 and 2. An operating lever K is pivotally mounted at K' upon the bar B' and a link L pivotally connects the lever K with the pin M carried by the shell H.

In Fig. 6 of the drawings, I have shown a series of locking members N³ hinged at their inner ends to the disk in which the blades are mounted and fastened to each of said members N² is a rod N⁵ which passes through openings in the disks N⁴ and N², and a nut N⁶ is mounted upon the threaded end of the rod N⁵. The disk N² is fastened to a shell N and which telescopes over the shaft N' and to which shell any operating lever mechanism may be connected for moving the same longitudinally for the purpose of throwing the locking members N³ into or out of the paths of the blades.

In Figs. 1 and 4 of the drawings, I have shown the blades arranged in pairs. In the form shown in Fig. 4, I have illustrated a cylindrical portion P' about the central shaft P² and lugs R project radially from the circumference of said cylinder and against which the free end of the inner series of blades D is adapted to contact while the inner ends of the outer series of blades D are adapted to contact with the rear or pivotal ends of the inner series of blades.

In Fig. 5 of the drawings, I have shown a slight modification in the arrangement of the blades in which they are disposed in series at right angles to the positions shown in the other figures of the drawings, each blade being mounted upon a radial arm W which is fastened to the shaft W' journaled in suitable bearings W². The blades W are substantially the length of said arms upon which they are journaled and the outer free swinging edge of each blade W, when the series is closed or thrown into operative positions, overlaps the inner end of an adjacent blade, thus producing a continuous surface to the current from one end of the motor to the other. Fixed to the shaft W' is a pulley W³ whereby power generated by the motor may be transmitted to any suitable object.

In operation, when the apparatus is utilized as a current or tide motor, the frame carrying the wheel is lowered in the water and the force of the current coming in contact with the blades will cause a rotary movement to be imparted to the motor. As the motor rotates, certain of the blades will feather in the manner shown in Figs. 3 and 4 of the drawings, while others will be presented either broad face or at right angles to the current to exert a propulsive force thereagainst.

In Fig. 4 of the drawings two sets of blades are shown in feathering positions to offer a minimum amount of resistance to the current, while the other blades are positioned to be acted upon by the force of the current. In the form shown in Fig. 3 of the drawings and assuming that the current is passing in the direction of the arrow, one of the blades is shown in feathering position while two of the blades are fulcrumed against lugs upon the circumference of the disk in which an increased leverage of the force of the water will be imparted to the motor at such times when an adjacent blade is blanked by one of the blades. In the event of the motor being utilized in tidal currents where the water ebbs and flows or strong under currents, the impact of the water coming from any direction against the motor will impart a rotary movement in the same direction to the apparatus.

When it is desired to hold the blades in inoperative positions, when the form of apparatus shown in Figs. 6 and 7 is employed, the shell N² may be moved downward so that the members N³ will project in the paths of the blades. A reverse movement to the shell N will cause the members N³ to be withdrawn from the paths of the blades and allow the same to rotate freely. The members N³ being hinged at their points of connection with the disk in which the blades are journaled, they will naturally, when released, fall to operative positions. In the form of stopping mechanism shown in Fig. 1, the lever K is operated to cause the shell H to move longitudinally upon the tubular portion B of the frame to bring the convexed edges of the shells J into such positions as to bear against the edges of the ends D² of the pintles thereby holding the blades from swinging upon their pivots.

In the application of my invention for aerial navigation, the shaft may be driven by any suitable motor apparatus which may cause the blades to be thrown forcibly down against the air and feather or return them upward, the principle involved being the same as when the apparatus is utilized as a current motor, excepting that the motor is driven in aerial navigation, whereas in water the motor will be driven by the current.

What I claim to be new is:—

1. A current operated motor comprising a series of blades having pintles projecting from the ends thereof, bearing means in which said pintles are mounted, the corresponding pintles each being bent laterally, a movable member having a convexed edge, and means for throwing the same into or out of the paths of the laterally extending ends of said pintles to cause certain of the blades to feather.

2. A current operated motor comprising a frame having disks parallel to each other, a series of blades each having a pintle projecting from one of the longitudinal marginal edges thereof and having bearings in said disks, the pintles at corresponding ends of the blades extending through one of the disks and being bent at an angle, a shell movable upon said frame, members fastened to said shell and provided with convexed edges which are adapted to be moved into the paths of said angled ends of the pintles, and means for moving said shell.

In testimony whereof I hereunto affix my signature in the presence of two witnesses.

PARKE T. SNYDER.

Witnesses:
A. L. HOUGH,
A. R. FOWLER.

Copies of this patent may be obtained for five cents each, by addressing the "Commissioner of Patents, Washington, D. C."